United States Patent
Baba et al.

(10) Patent No.: US 7,623,493 B2
(45) Date of Patent: Nov. 24, 2009

(54) METHOD AND APPARATUS FOR LINK LAYER ASSISTED HANDOFF

(75) Inventors: Kamel A. Baba, Elgin, IL (US); Mohammed D. Ali, Arlington Heights, IL (US); Kadathur S. Natarajan, Wilmette, IL (US)

(73) Assignee: Motorola, Inc., Schaumburg, IL (US)

( * ) Notice: Subject to any disclaimer, the term of this patent is extended or adjusted under 35 U.S.C. 154(b) by 707 days.

(21) Appl. No.: 11/353,716

(22) Filed: Feb. 13, 2006

(65) Prior Publication Data

US 2006/0245394 A1 Nov. 2, 2006

Related U.S. Application Data

(60) Provisional application No. 60/676,064, filed on Apr. 29, 2005.

(51) Int. Cl.
*H04W 4/00* (2006.01)
(52) U.S. Cl. .................................................. 370/331
(58) Field of Classification Search ................ 370/331; 455/436, 438, 437
See application file for complete search history.

(56) References Cited

U.S. PATENT DOCUMENTS

| 6,272,148 B1 * | 8/2001 | Takagi et al. ............ 370/469 |
| 6,590,885 B1 | 7/2003 | Jorgensen |
| 6,640,248 B1 | 10/2003 | Jorgensen |
| 2003/0125027 A1 | 7/2003 | Gwon et al. |
| 2003/0236860 A1 | 12/2003 | Yegin |
| 2005/0083885 A1 | 4/2005 | Ikeda et al. |
| 2006/0029020 A1 * | 2/2006 | Jung et al. ............ 370/331 |

FOREIGN PATENT DOCUMENTS

| EP | 1524806 A2 | 4/2005 |
| JP | 2004032204 A | 1/2004 |
| WO | WO 01/05100 A1 | 1/2001 |

OTHER PUBLICATIONS

IETF Draft "Low Latency Handoffs in Mobile IPv4", Network Working Group, K. El Malki, Editor, Internet-Draft, Ericsson, Jun. 2004, Expires Dec. 2004, <draft-ietf-mobileip-lowlatency-hyandoffs-v4-09.txt>. pp. 1-54.

* cited by examiner

*Primary Examiner*—Jayanti K Patel
*Assistant Examiner*—Matthew Campbell

(57) ABSTRACT

Various embodiments are described to address the need for an apparatus and method that improves upon known handoff techniques, such as Mobile IP and Fast Mobile IP, to improve the mobility experience of an end user. OSI layer 2-originated indications of a handoff being imminent (301, 501, 502), a link down for handoff (307, 509, 510), and a new link up after handoff (309, 511, 512) are introduced. These indications can be used by applications (such as real-time/streaming applications on the mobile (101)) to take suitable proactive measures prior to an actual handoff. Examples of such measures include the buffering of data to be used during the handoff interval in a way that improves the seamless mobility experience of the end user.

11 Claims, 5 Drawing Sheets

METHOD AND APPARATUS FOR LINK LAYER ASSISTED HANDOFF

REFERENCE(S) TO RELATED APPLICATION(S)

The present application claims priority from provisional application, Ser. No. 60/676,064, entitled "METHOD AND APPARATUS FOR LINK LAYER ASSISTED HANDOFF," filed Apr. 29, 2005, which is commonly owned and incorporated herein by reference in its entirety.

FIELD OF THE INVENTION

The present invention relates generally to communication systems and, in particular, to link layer assisted handoff in wireless communication systems.

BACKGROUND OF THE INVENTION

Typically, a packet switched wireless access network contains AN (Access Network) elements connected to a PDG (Packet Data Gateway). A PDG serves an MN (Mobile Node), via the AN to which the MN is attached. The PDG may provide connectivity for the MN to the packet data network and may perform the function of a mobility agent to support network layer mobility for the MN. A handoff of the MN may change the MN's Layer 2 point of attachment from one PDG to another PDG (either within the same wireless technology or across different wireless technologies), resulting in a new link layer and network layer connection being established between the MN and the new PDG. The problem of IP mobility is commonly addressed by the Mobile IP protocol; however, such a handoff can cause a significant disruption in real-time traffic due to issues such as handoff latencies, loss of transient packets caused by the Layer 2 handoff from the medium, and the Layer 3 protocol latency caused by Mobile IP protocol, for example.

These latencies impact the performance of real-time/streaming applications (e.g., audio and video) and other near real-time applications that are based on existing link layer technologies (e.g., cellular and WLAN (wireless local area network)) as well as emerging wireless technologies such as 802.16/WiMAX. A transient loss in connectivity or lack of response can lead to false indications and subsequent performance degradation of such applications. The total blackout period experienced by an application during handoff is typically a function of the Layer 2 handoff delay and, when network layer handoffs are involved, the Layer 3 delay also. Layer 2 latency is usually the time between link layer detachment from the old access point and reattachment at the new access point. Layer 3 latency is usually the time to re-establish L3 connectivity (e.g., the MN arriving on the new link and detecting and completing registration with Layer 3 agents).

The performance degradation can be apparent to the user and can impact the user's seamless mobility experience. For example, a user of a streaming video application running on a mobile station during a handoff may experience a visible loss in video frames and distortion. Moreover, in TCP-based applications, a loss of packets during handoff may be falsely interpreted by the TCP as a network performance problem like congestion, resulting in the TCP protocol resorting to back off mode (with congestion control and re-transmits), thereby reducing the overall TCP throughput. Thus, the effects of the handoff on TCP may not be limited to the handoff but may last well beyond the handoff interval.

Improved handoff techniques such as Fast Mobile IP handoff have been proposed in the IETF. These help improve the network layer handoff latency by helping overlap the Layer 2 and Layer 3 handoff processes. However, their performance is still limited by Layer 2 handoff latency. It appears that even with the Fast Mobile IP (FMIP) handoff scheme, there is still an inevitable packet loss and the negative impact of handoff on TCP-based applications remains unresolved.

Therefore, a need exists for an apparatus and method for link layer assisted handoff that addresses at least some of the above mentioned limitations of both standard and Fast Mobile IP handoff techniques and that can improve the mobility experience of an end user running an IP-based application (such as VoIP, image, video, streaming media, PTT, etc.).

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to address the need for an apparatus and method that improves upon known handoff techniques, such as Fast Mobile IP, to improve the mobility experience of an end user. OSI layer 2-originated indications of a handoff being imminent, a link down for handoff, and a new link up after handoff are introduced. These indications can be used by applications (such as real-time/streaming applications on the mobile) to take suitable proactive measures prior to an actual handoff. Examples of such measures include the buffering of data to be used during the handoff interval in a way that improves the seamless mobility experience of the end user.

Figure 1:
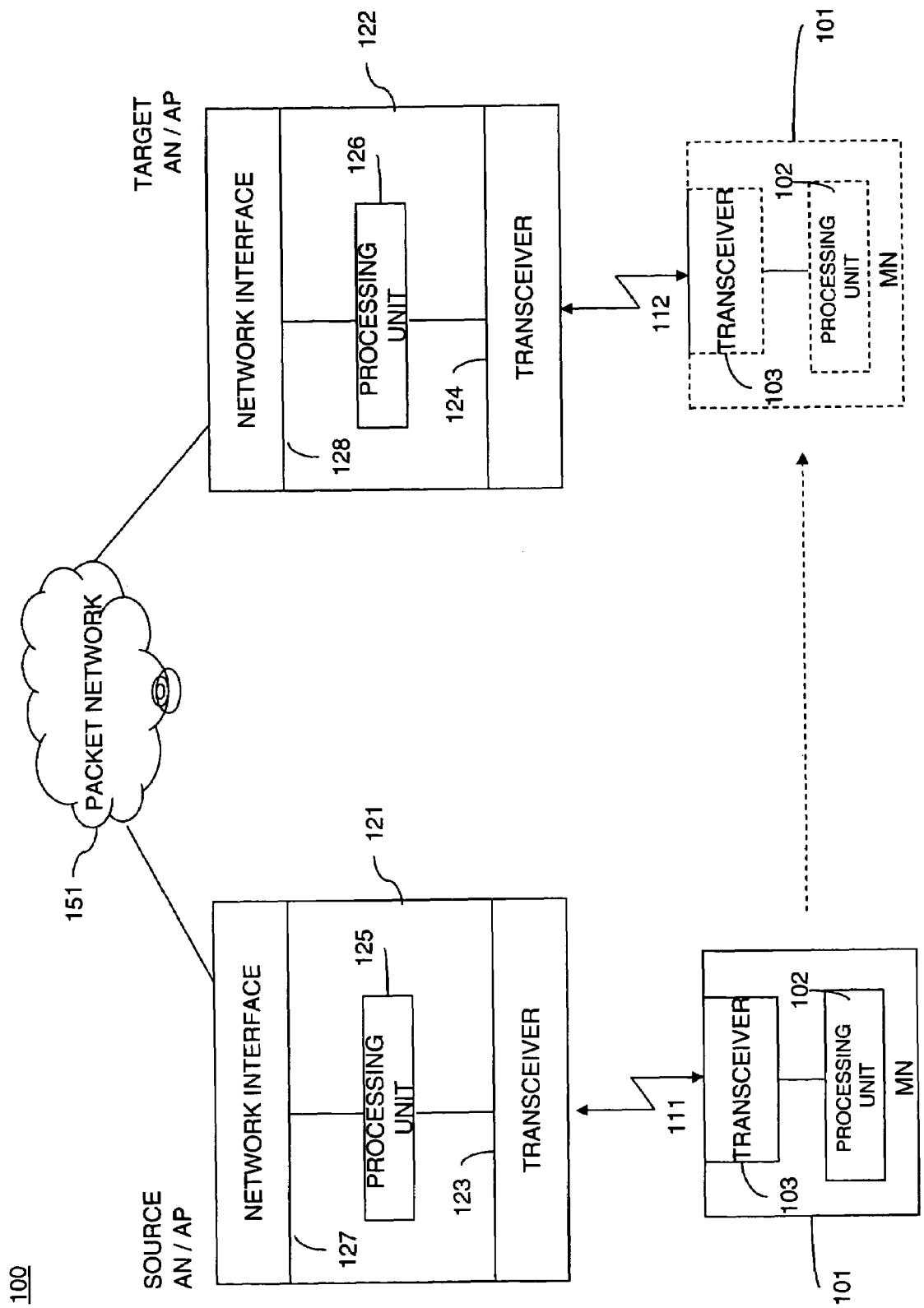
FIG. 1 is a block diagram depiction of a wireless communication system in accordance with multiple embodiments of the present invention.

The disclosed embodiments can be more fully understood with reference to FIGS. 1-5. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having access networks based on different wireless technologies. For example, the description that follows will assume that AN 121 is IEEE 802.XX-based while AN 122 is 3GPP2-based. Thus, AN 121 employs wireless technologies such as IEEE's 802.11, 802.16, or 802.20, while AN 122 employs wireless technologies such as CDMA 2000 or HRPD (also known as 1xEV-DO or IS-856), both ANs 121 and 122 are suitably modified to implement the present invention.

Alternative embodiments of the present invention may be implemented in communication systems that employ other or additional technologies such as, but not limited to, those described in the 3GPP specifications (e.g., GSM, GPRS, EDGE, W-CDMA, UTRAN, FOMA, UMTS, HSDPA, and HSUPA), those described in the IS-136 (TDMA Third Generation Wireless Standards) specification, those described in the IS-95 (CDMA) specification, 1xEV-DV technologies, and integrated dispatch enhanced network technologies. Alternative embodiments of the present invention may also be implemented in communication systems in which ANs 121 and 122 employ the same wireless technologies. Furthermore, alternative embodiments of the present invention may also be implemented in communication systems in which ANs 121 and 122 represent ANs that physically and/or functionally overlap considerably. For example, ANs 121 and 122 may differ only in the component APs, BTSs, or base station sectors that communicate with MN 101.

More specifically, communication system 100 comprises mobile node (MN) 101, access networks (ANs) 121 and 122, and packet network 151. Those skilled in the art will recognize that FIG. 1 does not depict all of the network equipment necessary for system 100 to operate but only those system components and logical entities particularly relevant to the description of embodiments herein. For example, ANs are known to comprise one or more devices such as WLAN (wireless local area network) stations (which include access points (APs), AP controllers/switches, and/or WLAN switches), base transceiver stations (BTSs), base site controllers (BSCs) (which include selection and distribution units (SDUs)), packet control functions (PCFs), packet control units (PCUs), and/or radio network controllers (RNCs). However, none of these devices are specifically shown in FIG. 1.

Instead, ANs 121 and 122 are depicted in FIG. 1 as comprising processing units 125 and 126, network interfaces 127 and 128, and transceivers 123 and 124. In general, components such as processing units, network interfaces, and transceivers are well-known. For example, AN processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement an AN processing unit that performs the given logic. Therefore, ANs 121 and 122 represent known ANs that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, the AN aspect of the present invention may be implemented in any of the AN devices listed above or distributed across such components.

ANs 121 and 122 use wireless interfaces 111 and 112 for communication with MN 101. Since, for the purpose of illustration, AN 121 is IEEE 802.XX-based while AN 122 is 3GPP2-based, wireless interfaces 111 and 112 correspond to an IEEE 802.XX air interface and a 3GPP2 air interface, respectively.

MN platforms are known to refer to a wide variety of consumer electronic platforms such as, but not limited to, mobile stations (MSs), access terminals (ATs), terminal equipment, gaming devices, personal computers, and personal digital assistants (PDAs). In particular, MN 101 comprises processing unit 102, transceiver 103, a keypad (not shown), a speaker (not shown), a microphone (not shown), and a display (not shown). Processing units, transceivers, keypads, speakers, microphones, and displays as used in MNs are all well-known in the art.

For example, MN processing units are known to comprise basic components such as, but not limited to, microprocessors, digital signal processors (DSPs), microcontrollers, memory devices, application-specific integrated circuits (ASICs), and/or logic circuitry. Such MS components are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, MN 101 represents a known MN that has been adapted, in accordance with the description herein, to implement embodiments of the present invention.

Operation of various embodiments in accordance with the present invention occur substantially as follows. Relevant operation begins with AN 121, MN 101, or both AN 121 and MN 101 sending messaging to each other via wireless interface 111 using Open Systems Interconnection (OSI)-based communication interfaces. In particular, the OSI-based communication interfaces are employed by processing units 125 and 102 to transmit messaging via respective transceivers 123 and 103 to MN 101 and AN 121, respectively. While sending and receiving messaging, a situation arises in which a handoff from serving, or source, AN 121 to target AN 122 becomes desirable.

Figure 2:
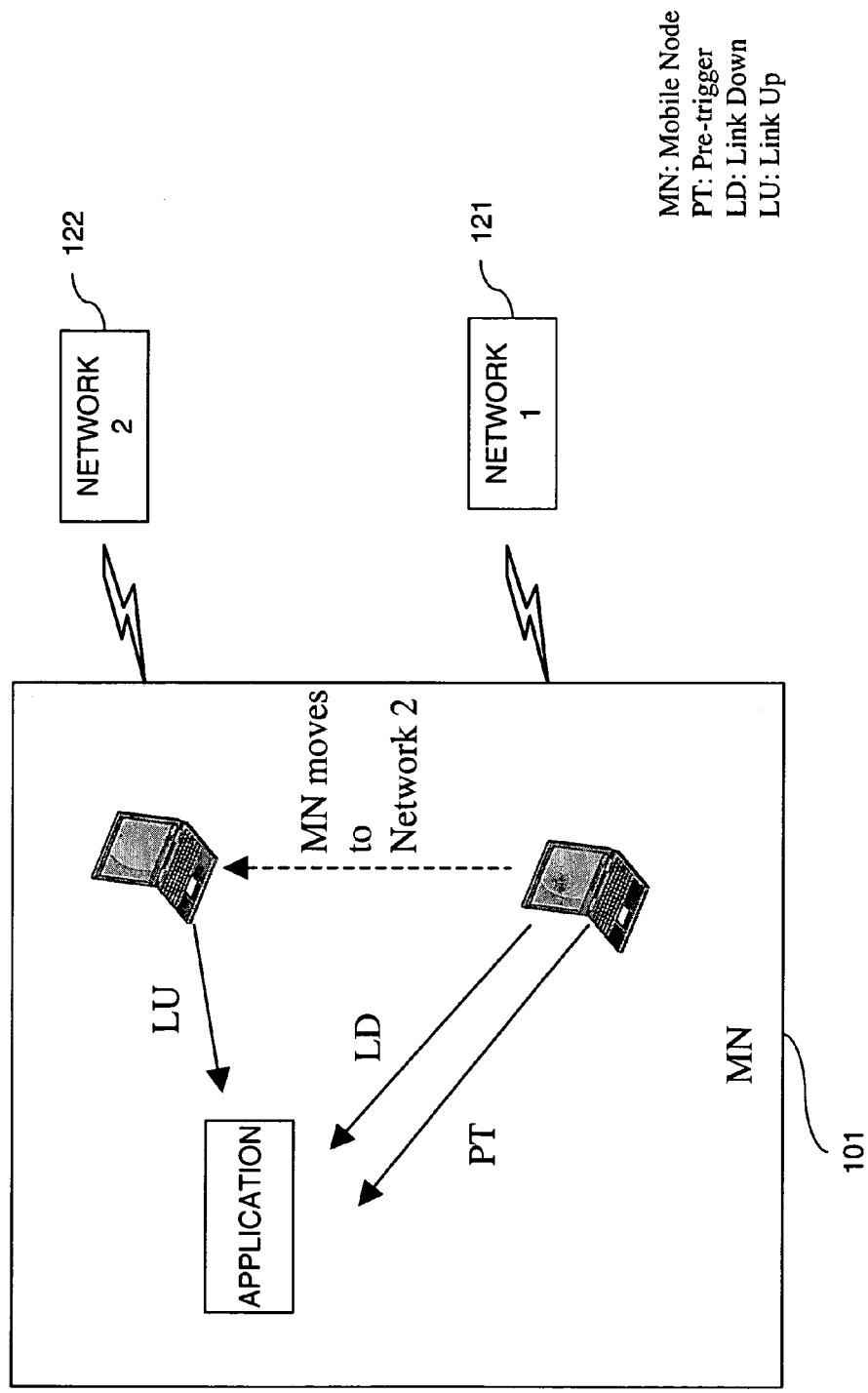
FIG. 2 is a block diagram depiction of a mobile node (MN) handoff in accordance with certain embodiments of the present invention in which the MN controls the handoff.
Figure 3:
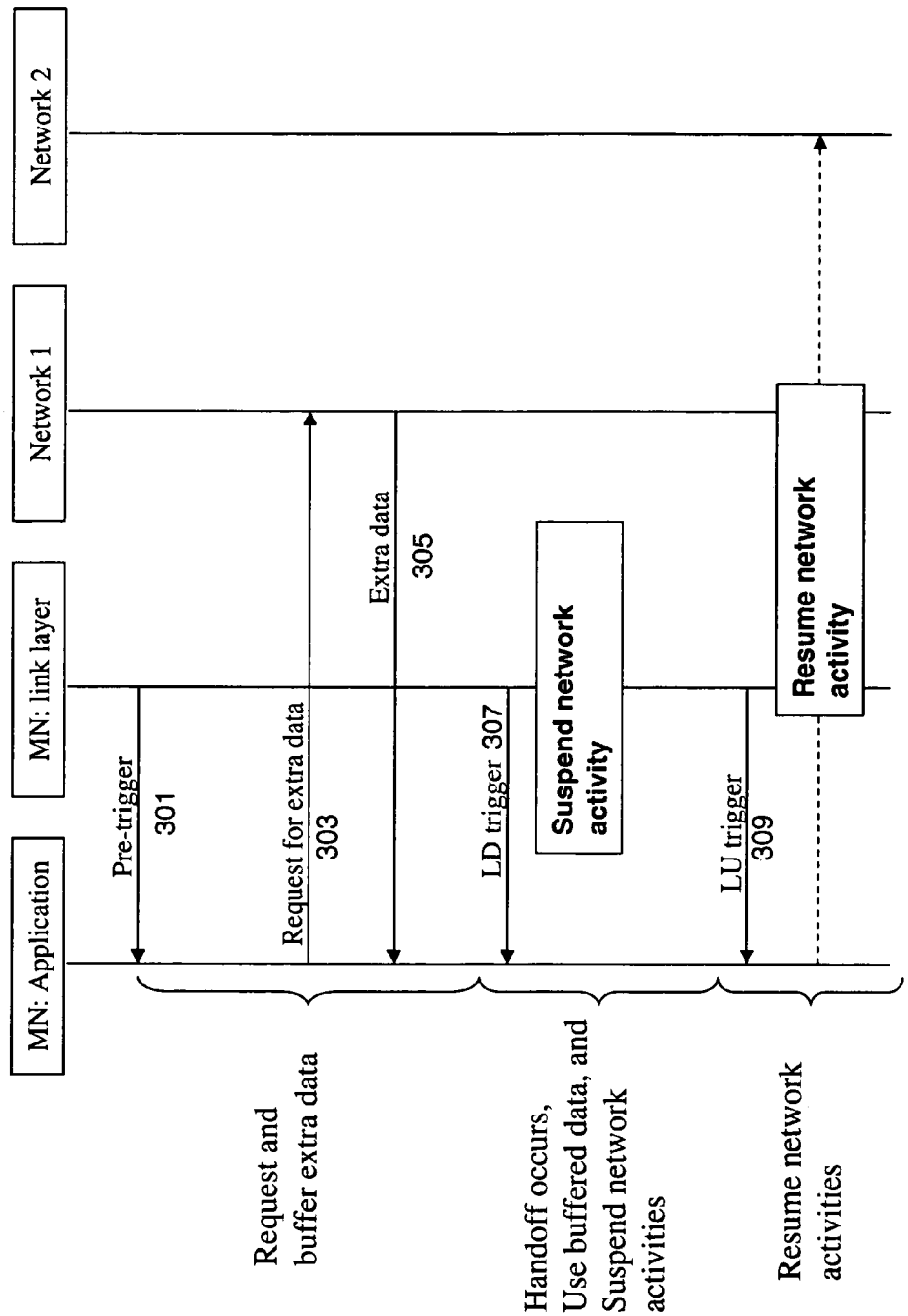
FIG. 3 is an exemplary signaling flow diagram depicting an MN handoff, in accordance with certain embodiments of the present invention in which the MN controls the handoff.
Figure 4:
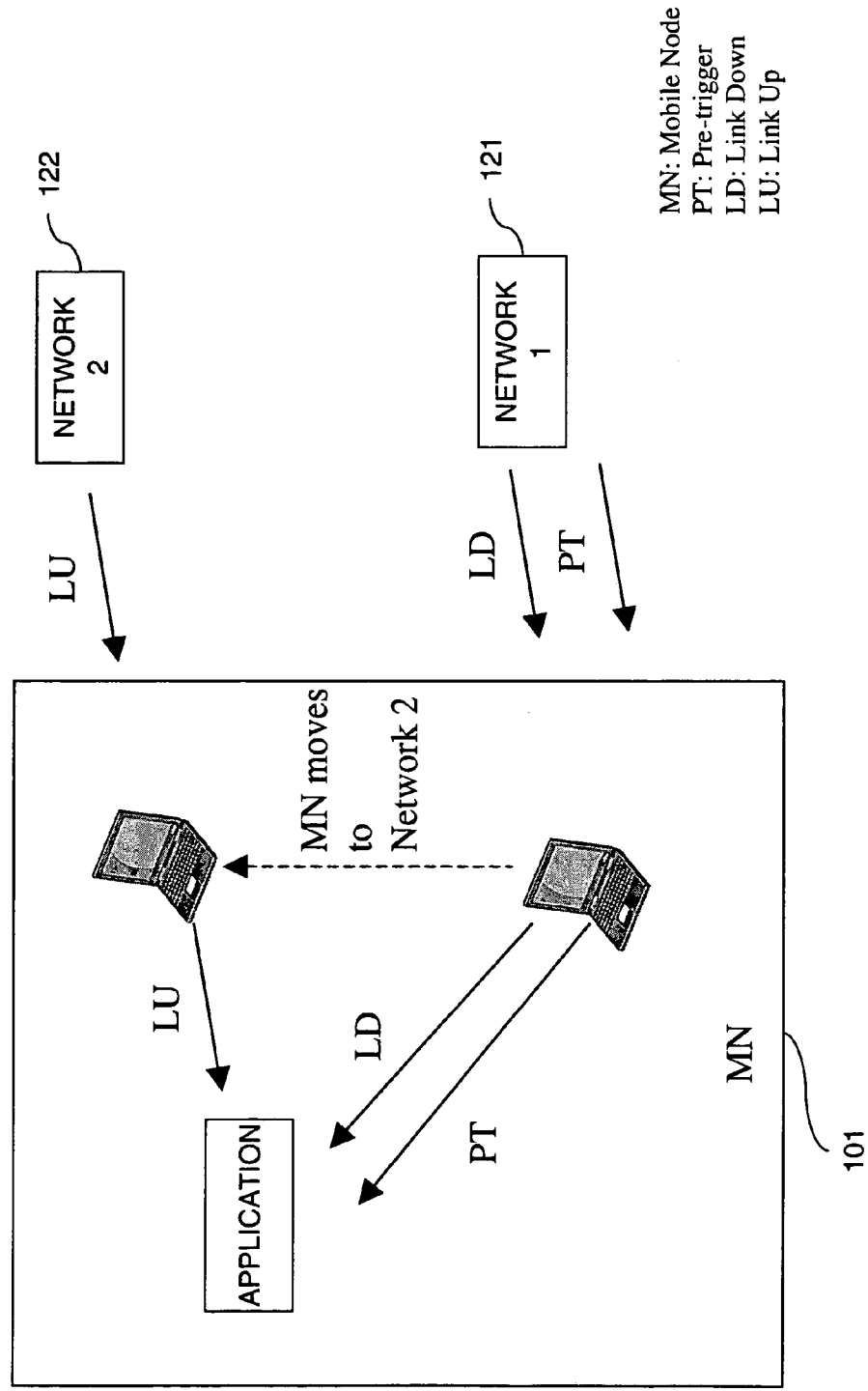
FIG. 4 is a block diagram depiction of a mobile node (MN) handoff in accordance with certain embodiments of the present invention in which a network controls the handoff.
Figure 5:
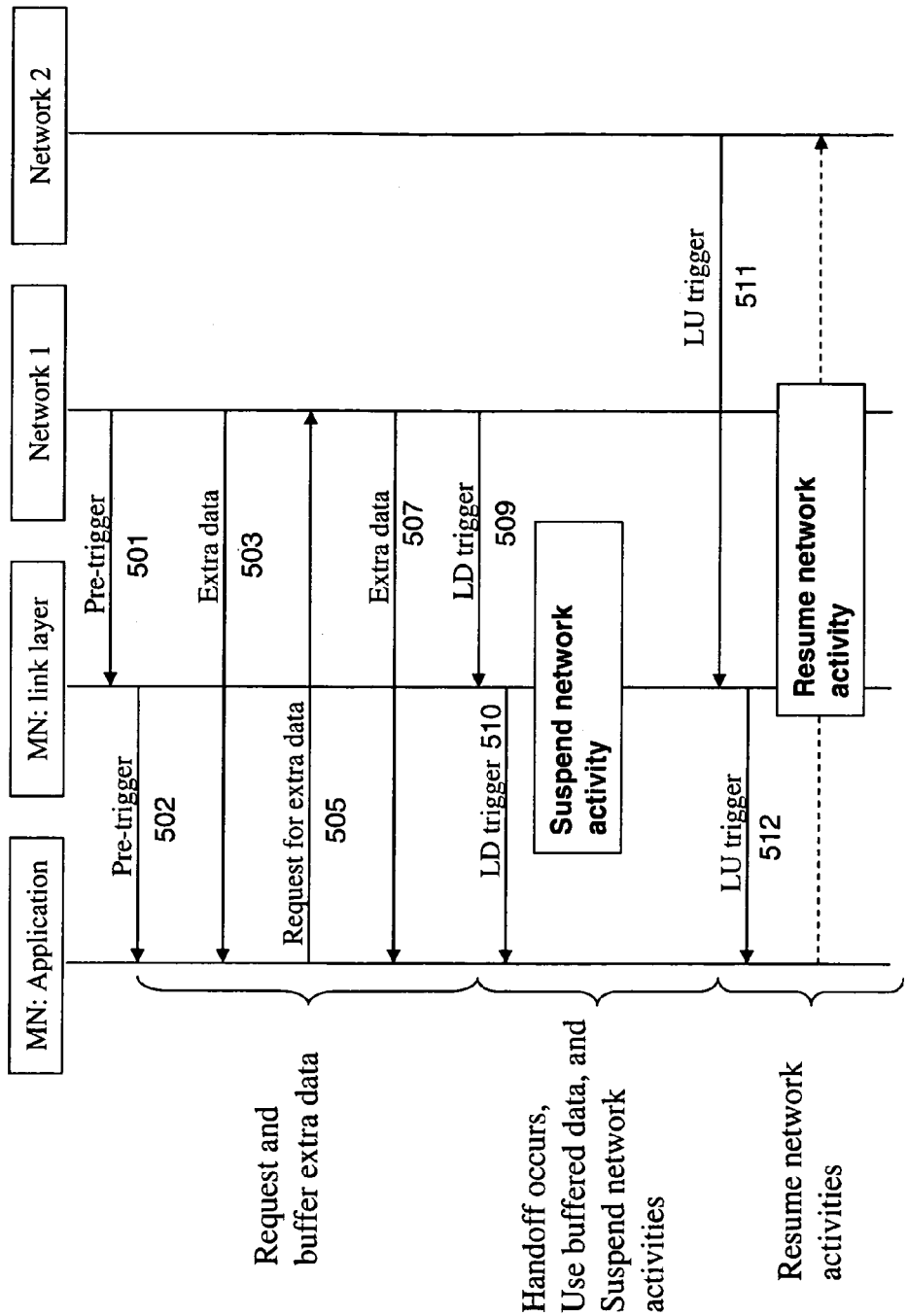
FIG. 5 is an exemplary signaling flow diagram depicting an MN handoff, in accordance with certain embodiments of the present invention in which a network controls the handoff.

Techniques for determining when and where to handoff are well-known for existing wireless technologies. Depending on the embodiment, handoff determination and control may reside with either the mobile or the network. FIGS. 2 and 3 provide exemplary illustrations for MN-controlled handoffs, while FIGS. 4 and 5 provide exemplary illustrations for network-controlled handoffs.

FIG. 2 is a block diagram depiction of an MN handoff and FIG. 3 is an exemplary signaling flow diagram depicting an MN handoff, both in accordance with certain embodiments of the present invention in which the MN controls the handoff. In diagram 200, MN 101 is shown first obtaining services via network 121 and then handing off to network 122. An application, such as voice-over-internet protocol (VoIP), resides on MN 101 (processing unit 102) and operates at an OSI layer above layer 3 in its communication with network 121 via an OSI-based communications interface.

Depending on the embodiment, MN processing unit 102 provides some or all of the following indications to the application as MN 101 proceeds to and completes a handoff to network 122. In the embodiments depicted by block diagram 200 and signaling flow diagram 300, these indications are all MN 101, OSI layer 2 (L2)-originated. As depicted, these indications take the form of event triggers. MN applications may have to pre-register or subscribe to these trigger events to get notified when the events actually occur. However, the indications may be conveyed by alternative means or in alternative forms depending on the particular embodiment.

The OSI layer 2 (L2)-originated indications include: an indication that a handoff to a target OSI-based communications interface is imminent (e.g., a pre-trigger), an indication that a link to a serving OSI-based communications interface is down for the handoff to the target OSI-based communications interface (e.g., a link down trigger), and an indication that a link to the target OSI-based communications interface is up (e.g., a link up trigger). In one or more of the embodiments depicted by block diagram 200 and signaling flow diagram 300, MN processing unit 102 provides to the application the OSI layer 2 (L2)-originated indication that a handoff to a target OSI-based communications interface is imminent (i.e., pre-trigger 301). Pre-trigger 301 is generated just before the handoff occurs. Depending on the embodiment, the pre-trigger may contain information about the new point of attachment (e.g., IP information about the new access router) and also application specific information such as available bandwidth on the new channel, QoS parameters, AAA, etc.

In response to pre-trigger 301, MN processing unit 102 may request that additional data for use during handoff be sent to the MN prior to handoff. This request 303 for additional data to cover the handoff blackout period, may require network 121 to make extra bandwidth available to the MN for the extra data transfer. Prior to handoff, MN processing unit 102 then receives from network 121 additional or extra data 305 for use during handoff.

MN processing unit 102 then provides to the application an OSI layer 2 (L2)-originated indication that the link to the serving OSI-based communications interface is down for the handoff to the target OSI-based communications interface (i.e., link down trigger 307). Thus, link down trigger 307 is generated when the current link for the MN 101 goes down for the handoff. When a new link is established, MN processing unit 102 provides to the application an OSI layer 2 (L2)-originated indication that a link to the target OSI-based communications interface is up (i.e., link up trigger 309). Link up trigger 309 is sent as soon as traffic may be sent or received via the new link with network 122. This may first require successfully registering on the new network.

FIG. 4 is a block diagram depiction of an MN handoff and FIG. 5 is an exemplary signaling flow diagram depicting an MN handoff, both in accordance with certain embodiments of the present invention in which the network controls the handoff. In diagram 400, MN 101 is shown first obtaining services via network 121 and then handing off to network 122. An application, such as voice-over-internet protocol (VoIP), resides on MN 101 (processing unit 102) and operates at an OSI layer above layer 3 in its communication with network 121 via an OSI-based communications interface.

Depending on the embodiment, MN processing unit 102 provides some or all of the following indications to the application as MN 101 proceeds to and completes a handoff to network 122. These indications take the form of event triggers. MN applications may have to pre-register or subscribe to these trigger events to get notified when the events actually occur. However, the indications may be conveyed by alternative means or in alternative forms depending on the particular embodiment. In the embodiments depicted by block diagram 400 and signaling flow diagram 500, these indications are themselves triggered by network-originated, OSI layer 2 (L2)-originated indications, which are received by MN processing unit 102 via transceiver 103.

The network-originated, OSI layer 2 (L2)-originated indications include: an indication that a handoff to a target OSI-based communications interface is imminent (e.g., a pre-trigger indication), an indication that a link to a serving OSI-based communications interface is going down for the handoff to the target OSI-based communications interface (e.g., a link down trigger indication), and an indication that a link to the target OSI-based communications interface is up (e.g., a link up trigger indication). In one or more of the embodiments depicted by block diagram 400 and signaling flow diagram 500, network 121 sends to MN 101 pre-trigger indication 501. In turn, MN processing unit 102 receives pre-trigger indication 501 and provides to the application pre-trigger 502. Depending on the embodiment, pre-trigger indication 501 and pre-trigger 502 may contain information about the new point of attachment (e.g., IP information about the new access router) and also application specific information such as available bandwidth on the new channel, QoS parameters, AAA, etc.

Network 121 may also provide additional bandwidth (e.g., a supplemental channel) to convey extra data 503 that the MN application can store and use locally while the L2 handoff is in progress. Network 121 can proactively start sending the additional data 503 as soon as it sends pre-trigger indication 501. The handoff blackout time can be estimated based on what source and destination access technologies are involved. In general, the estimates can be dynamically tuned with better values as the mobile moves and actual blackout times are recorded, for example. The computed blackout time estimate, the type of codec (coder-decoder) being used, and/or the local link condition may be used to determine the amount of data needed for the handover interval.

In response to pre-trigger indication 501 and pre-trigger 502, MN processing unit 102 may request that additional data for use during handoff be sent to the MN prior to handoff. This request 505 for additional data to cover the handoff blackout period, may specify how much data the MN desires for the handoff blackout interval. Prior to handoff, MN processing unit 102 may then receive (or continue to receive) from network 121 additional or extra data 507 for use during handoff.

Network 121 then sends to MN 101 link down trigger indication 509. In turn, MN processing unit 102 provides to the application link down trigger 510. Network 121 can use link down trigger indication 509 as a notification for network detachment, thereby suspending network activity. The MN application may then start using any extra data buffered for the handoff.

When a new link is established, MN processing unit 102 receives link up trigger indication 511 and provides to the application link up trigger 512. Link up trigger indication 511 and link up trigger 512 can serve as a notification to the MN application to resume its services via the new network 122 and perhaps to start using any application specific parameters that were conveyed via pre-trigger indication 501 and pre-trigger 502 (e.g., adjusting its codec to suit the bandwidth of the new network).

As discussed above, OSI L2-originated indications of a handoff being imminent, a link down for handoff, and a new link up after handoff can be used by applications to improve user experience during handoff. How an application uses these indications will vary depending on the application involved. For example, an application could ask for some supplemental resources to acquire data packets prior to handoff and store and use this data during the handoff, thus compensating for handoff packet loss. This ability reduces the overall impact of a handoff on an application and hence provides enhanced performance and a more seamless experience for the end user of the application. This is especially true when the mobile is moving fast and a disruption in service is primarily observed during a handoff.

Although techniques discussed herein are applicable to both inter- and intra-technology handoffs, they can find strong applicability in inter-technology handoffs where a mobile could be handing off WLAN to a cellular network or vice-versa. The handoff latency during this interval is significant and an indication from the network to the application about an inter-technology handoff could help the application to take appropriate steps to accommodate the handoff latency interval and also re-configure its parameters to adapt to the destination technology.

Regarding packet loss, given a link down indication the application can suspend network activity during a handoff and thus avoid problems in which a lack of response during the handoff interval leads to a false indication to the IP layer protocols like TCP. Suspending network activity in this manner can avoid TCP back off mode in which overall throughput is reduced. The application can also notify its peer process to stop sending traffic until notified, thus avoiding loss of packets in transit during handoff.

The techniques discussed herein complement Fast Mobile IP, which provides a smaller (compared to standard Mobile IP) and predictable handoff blackout time. This time could be taken into account by the application and data corresponding to this interval could be appropriately requested and stored prior to handoff.

The techniques discussed herein also enable the mobile applications to be able to start the authentication and registration process on the new network in parallel with the handoff process (for example, by conveying AAA information via one or more of the L2-originated indications).

The techniques discussed herein can also improve resource usage by enabling the mobile to selectively request supplemental network resources depending on the appropriate trigger notification. The network could have a policy in place that regulates how much burst data can be requested by the mobile, for example.

In conclusion, the real-time/streaming application running on the mobile often knows better the semantics of the application data it is sending/receiving. Therefore, it is typically in a better position to decide what to do during a handoff. When notified of a handoff, the application can, for example, request the data it needs to cover the blackout time and the data is pre-fetched and stored in the mobile's buffer. This data is then consumed (i.e., played out) during the Layer 2 handoff, and the application can resume communications when notified that the new link is up.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for link layer assisted handoff, the method comprising the steps of:

indicating by layer 2 (L2) of an Open Systems Interconnection (OSI)-based communications interface that a handoff from a serving OSI-based communications interface to a target OSI-based communications interface is imminent, wherein L2 of the OSI-based communications interface indicates to an application operating at an OSI layer above OSI layer 3 that the handoff is imminent;

requesting, by the application, that additional data for use during handoff be sent to a mobile node (MN) prior to handoff, wherein the request is directed to an access network (AN) and is in response to the OSI layer 2 (L2)-originated indication that the handoff to a target OSI-based communications interface is imminent; and receiving, prior to handoff from an access network (AN) and prior to an OSI layer 2 (L2)-originated indication that a link to the serving OSI-based communications interface is down for the handoff to the target OSI-based communications interface, additional data for use during the handoff.

2. The method of claim 1, further comprising the step of:
receiving, from an access network (AN), an OSI layer 2 (L2)-originated indication that the handoff to a target OSI-based communications interface is imminent for a mobile node (MN).

3. The method of claim 1, further comprising the step of:
receiving, from an access network (AN), an OSI layer 2 (L2)-originated indication that the link to the sewing OSI-based communications interface is down for the handoff to the target OSI-based communications interface.

4. The method of claim 1, further comprising the step of:
providing to the application, subsequent to indicating that the link to the serving OSI-based communications interface is down for the handoff, an OSI layer 2 (L2)-originated indication that a link to the target OSI-based communications interface is up.

5. The method of claim 1, further comprising the step of:
receiving, from an access network (AN), an OSI layer 2 (L2)-originated indication that the link to the target OSI-based communications interface is up.

6. A mobile node (MN) comprising:
a transceiver; and
a processing unit, communicatively coupled to the transceiver,
   adapted to provide an Open Systems Interconnection (OSI)-based communications interface for use by an application, operating at an OSI layer above OSI layer 3, to communicate via the transceiver;
   adapted to provide to the application an OSI layer 2 (L2)-originated indication that a handoff to a target OSI-based communications interface is imminent;
   adapted to send from the application a request that additional data for use during handoff be sent to the MN prior to handoff in response to the OSI layer 2 (L2)-originated indication that the handoff to a target OSI-based communications interface is imminent; and
   adapted to provide to the MN via the transceiver, prior to handoff from the AN and prior to an OSI layer 2 (L2)-originated indication that a link to a serving OSI-based communications interface is down for the handoff to the target OSI-based communications interface, additional data for use during the handoff.

7. The MN of claim 6, wherein the processing unit is further adapted to receive, from an access network (AN) via the transceiver, an OSI layer 2 (L2)-originated indication that the handoff to a target OSI-based communications interface is imminent for the MN.

8. The MN of claim 6, wherein the processing unit is further adapted to receive, from an access network (AN) via the transceiver, an OSI layer 2 (L2)-originated indication that the link to the sewing OSI-based communications interface is down for the handoff to the target OSI-based communications interface.

9. The MN of claim 6, wherein the processing unit is further adapted to provide to the application, subsequent to indicating that the link to the serving OSI-based communications interface is down for the handoff, an OSI layer 2 (L2)-originated indication that a link to the target OSI-based communications interface is up.

10. The MN of claim 9, wherein the processing unit is further adapted to receive, from an access network (AN) via the transceiver, an OSI layer 2 (L2)-originated indication that the link to the target OSI-based communications interface is up.

11. An access network (AN) comprising:
a transceiver;
a network interface; and
a processing unit, communicatively coupled to the transceiver and the network interface,
   adapted to provide an Open Systems Interconnection (OSI)-based communications interface for communication via the transceiver with a mobile node (MN);
   adapted to send to the MN via the transceiver an OSI layer 2 (L2)-originated indication that a handoff to a target OSI-based communications interface is imminent, wherein L2 of the OSI-based communications interface indicates to an application operating at an OSI layer above OSI layer 3 that the handoff is imminent;
   adapted to receive from the application a request that additional data for use during handoff be sent to a mobile node (MN) prior to handoff in response to the OSI layer 2 (L2)-originated indication that the handoff to a target OSI-based communications interface is imminent; and
   adapted to send to the MN via the transceiver, prior to handoff from the AN and prior to an OSI layer 2 (L2)-originated indication that a link to a serving OSI-based communications interface is down for the handoff to the target OSI-based communications interface, additional data for use during the handoff.

* * * * *